Oct. 22, 1963  H. L. BYLAND ETAL  3,107,375
BOOK BINDING APPARATUS
Filed Feb. 19, 1960  6 Sheets-Sheet 1
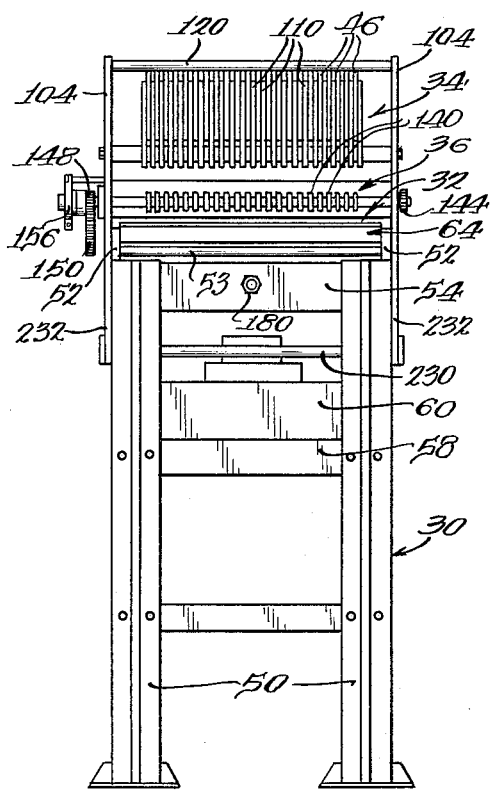
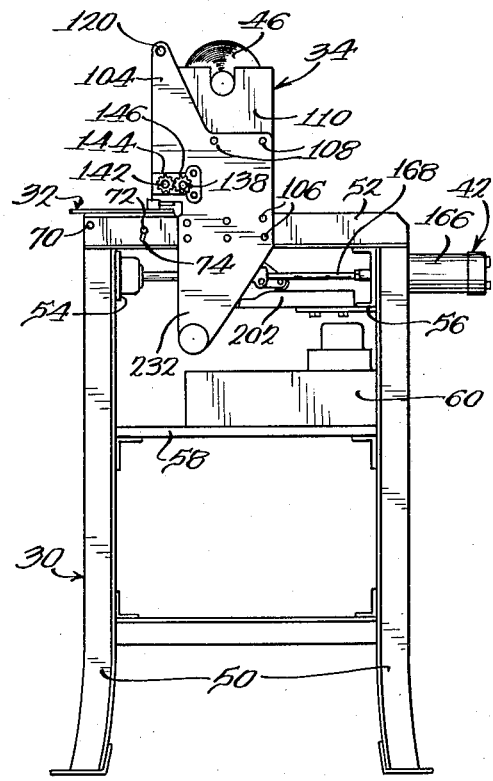
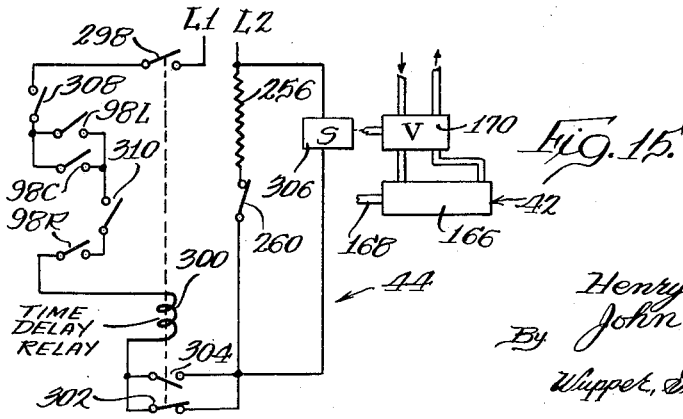
INVENTORS.
Henry Lowell Byland
John A. Van Auken
By Wupper, Gradolph & Love
Attys.

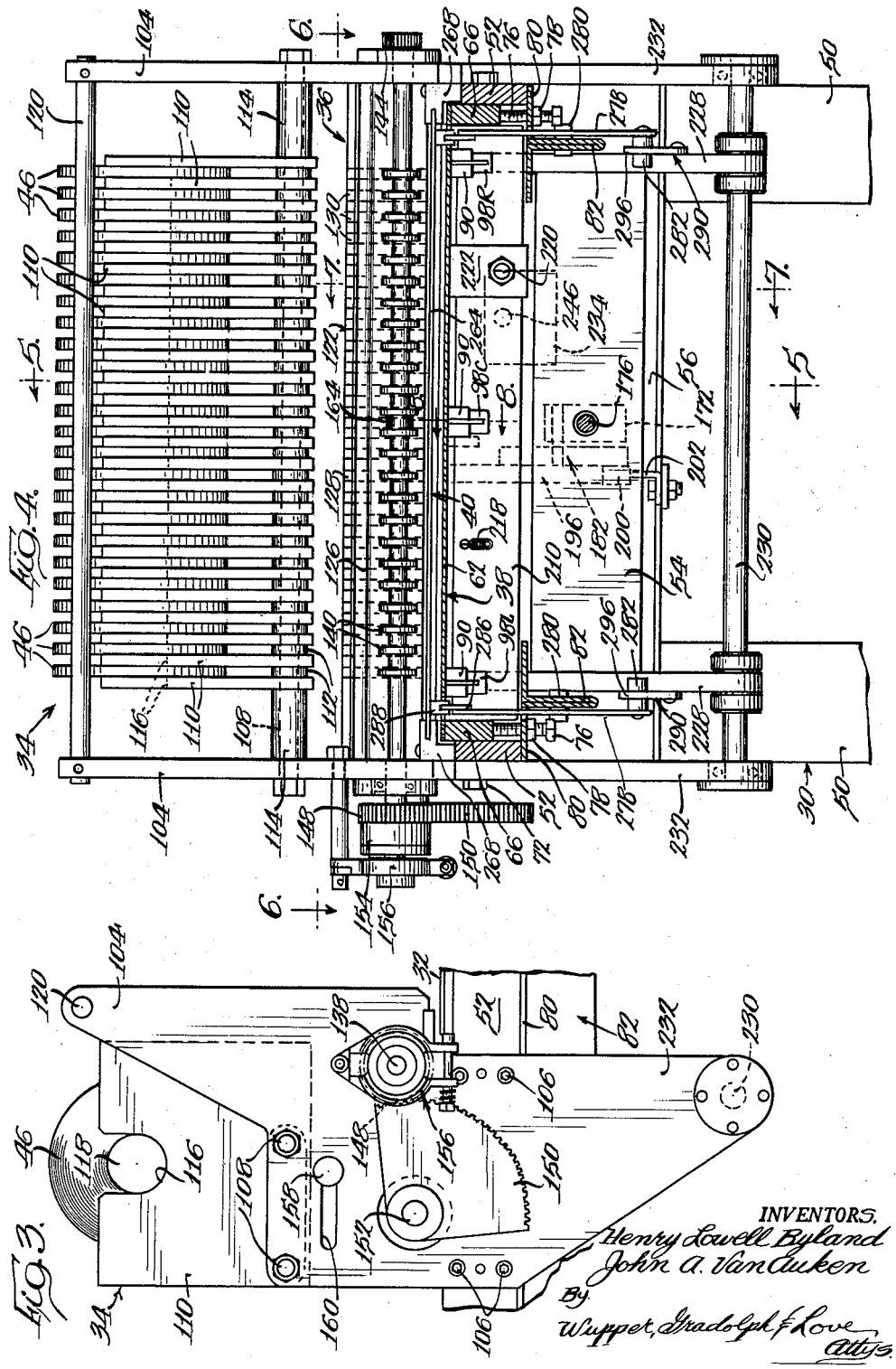

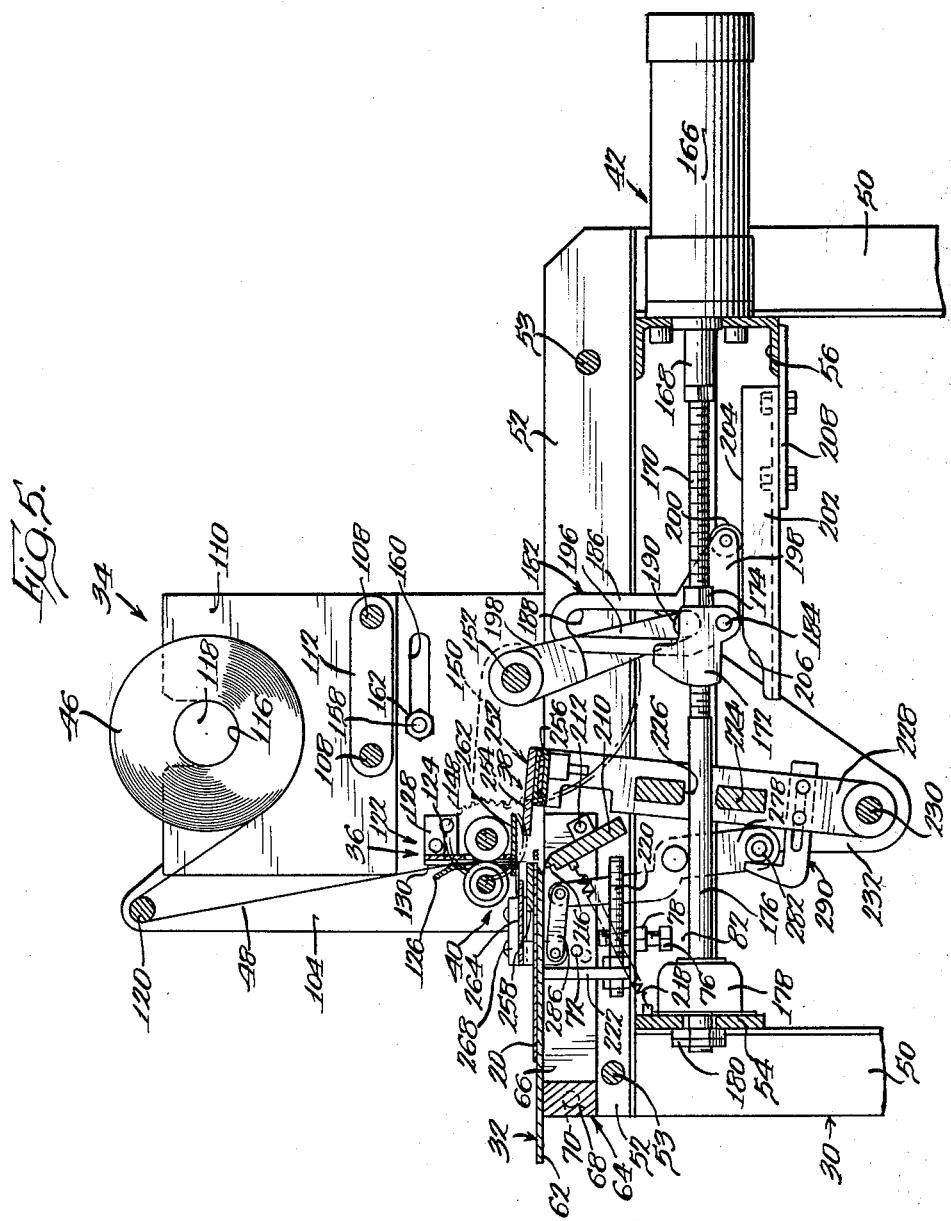

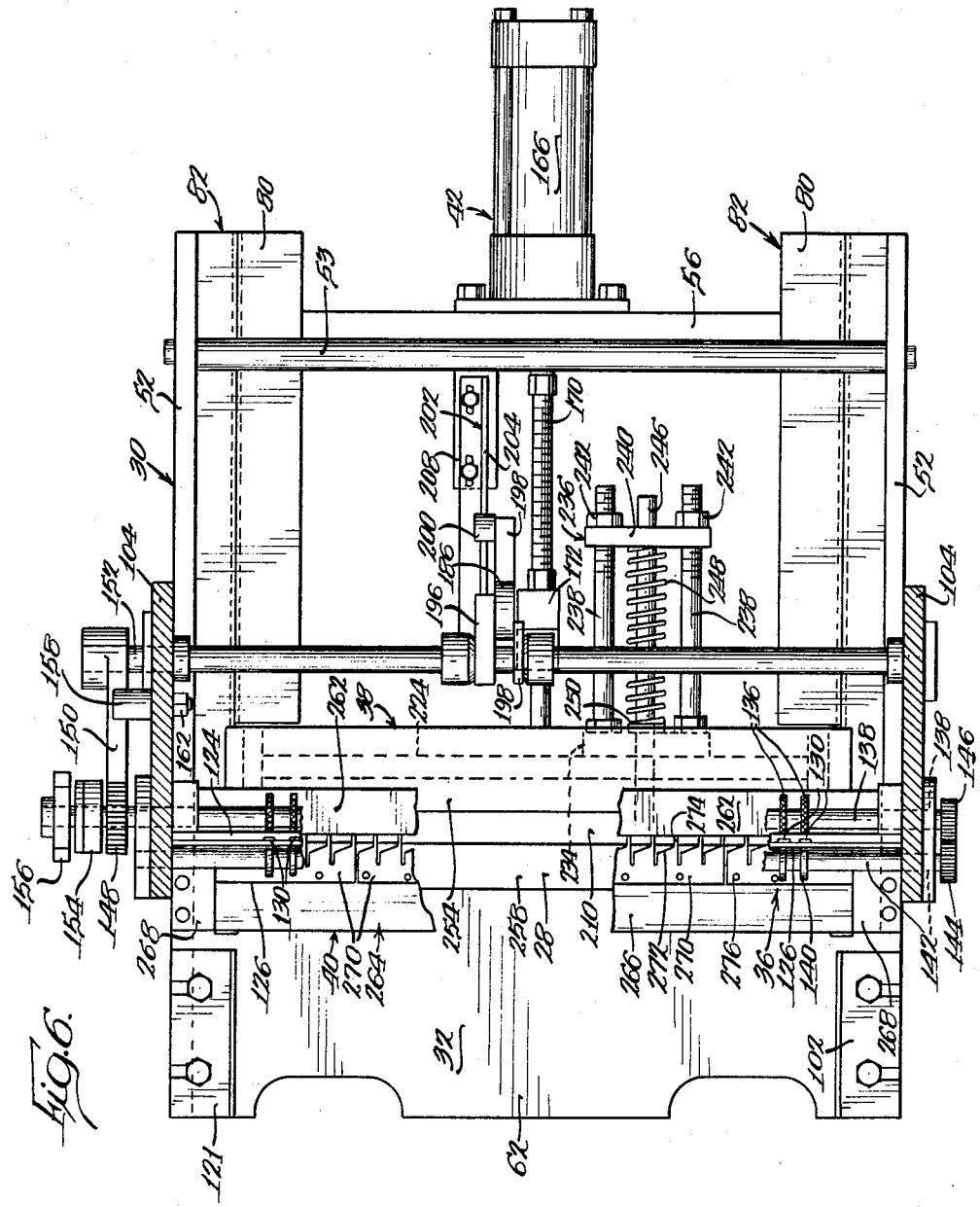

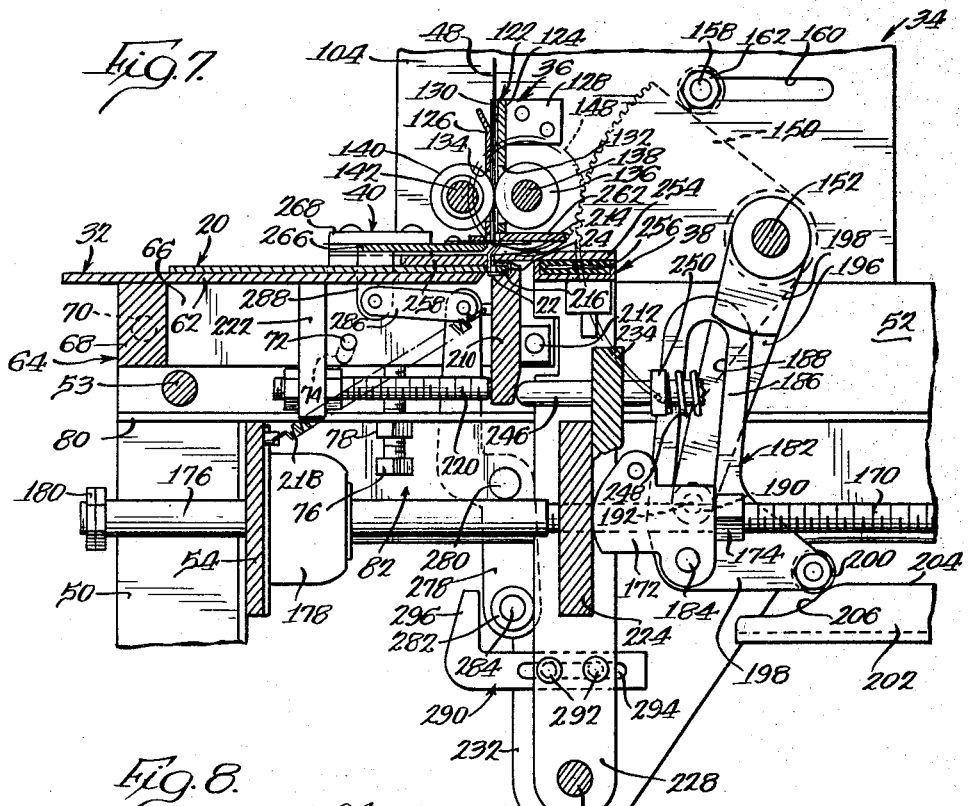
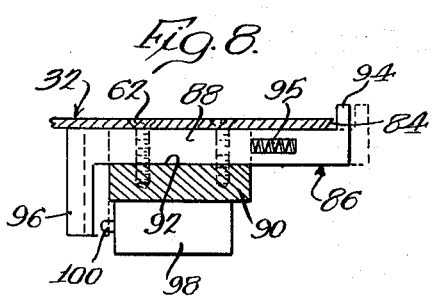
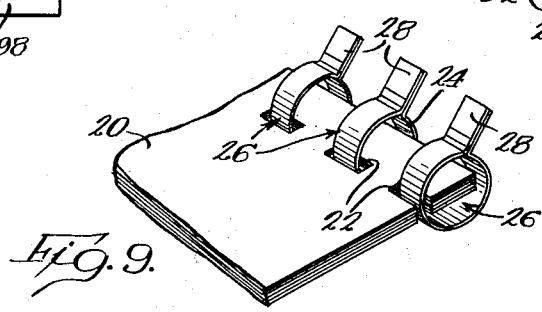
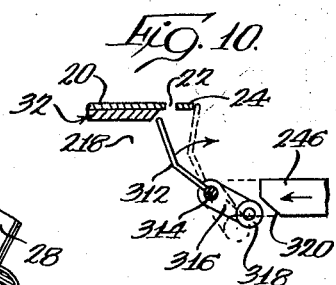

Oct. 22, 1963 H. L. BYLAND ETAL 3,107,375
BOOK BINDING APPARATUS
Filed Feb. 19, 1960 6 Sheets-Sheet 6

INVENTORS.
Henry Lowell Byland
John A. Van Auken
By Wupper, Bradolph & Love
Attys.

United States Patent Office 3,107,375
Patented Oct. 22, 1963

3,107,375
BOOK BINDING APPARATUS
Henry Lowell Byland, Deerfield, and John A. Van Auken, Park Ridge, Ill., assignors, by direct and mesne assignments, to Eliot Hyman, New York, N.Y., Harry Levine, Wellesley Hills, Mass., and Samuel H. Haims, Stamford, Conn.
Filed Feb. 19, 1960, Ser. No. 9,810
6 Claims. (Cl. 11—1)

The present invention relates to a new and improved method, and the apparatus for carrying out that method, of binding marginally perforated sheets into books or booklets with plastic loops or rings.

Marginally perforated sheets are presently bound into a book by means of plastic binder having a spine from which curved fingers of stiff plastic material project to be threaded through the perforations. These perforations usually are rectangular in shape and the plastic spine has a stiff backing portion which extends the full length of the sheets and integrally formed curved fingers which form a closure from which the sheets may not be readily disengaged, thus binding them substantially permanently together in the form of a book. This is done for a variety of types of books, such as check books, salesmen's manuals, and the like. These books have a disadvantage in that the plastic spine is relatively stiff and substantially incompressible, so that when the books are stacked together the spines stack one on top of the other, creating a thickness which is appreciably greater than the thickness of the book at any other portion. This condition obtains even when the books are stacked so that the spines are placed alternately at one side and then the other, and the two edges of the stack are appreciably higher and thicker than the center. This creates obvious problems in storing, shipping, filing, and the like. In addition to the problems encountered in stacking books bound with the rigid binders, there are other disadvantages. It is impossible to open such books at 360°; that is, they cannot be opened with the back cover and adjacent pages lying flat against the front cover.

Furthermore, the relatively rigid binders now commonly used on check books, salesmen's manuals and the like must be prefabricated. They are usually made by stamping flat sheets of plastic material into blanks wherein the previously mentioned fingers project from one side of a spline strip. The blank is heated and curled so that the fingers overlap the now curved spline. The manufacture of such blanks obviously entails substantial waste of plastic material and expensive apparatus for making and curling the blanks so that they might subsequently be used in binding the perforated sheets into books and the like.

The assembly of the perforated sheets and prefabricated binders into books necessitates uncurling the binder to free the fingers, guiding the stiff fingers through the perforations, and then inserting the fingers under the curved spine to prevent inadvertent removal of the sheets from the book. It is obvious that this assembling process is relatively slow and assembling speeds of about two books per minute is considered efficient.

The use of other types of binding loops or rings has been suggested by making them of paper or of ribbons of flexible plastic material, but the difficulties in handling these other materials, particularly thermoplastic ribbons, for making the loops of the binder have heretofore proved to be insurmountable.

The present invention is concerned with a practical method and a practical machine for binding marginally perforated sheets into booklets by means of loops which are made from pliable thermoplastic ribbons of a thickness of three or four thousandths of an inch. Such loops will lie flat against the sheets and will add very little to the thickness of the books at the bound edge, thereby permitting such books to be stacked or filed without inconvenience, to be packaged for shipment economically, and to be opened by turning the covers and pages through 360°.

It is, therefore, an object of the present invention to provide a new and improved method and apparatus for carrying out the method for binding marginally perforated sheets into books and the like, by means of loops of pliable thermoplastic material having a thickness of a very few thousandths of an inch.

Another object is to provide a new and improved apparatus and method for binding marginally perforated sheets into books and the like, wherein the rate of assembling the perforated sheets and binders into books is at least five times as great as now commercially obtainable.

Another object is to provide a new and improved apparatus and method for binding marginally perforated sheets into books and the like, wherein there is substantially no wastage of binding material, the assembly is more rapid than techniques now in use, and the binding plastic is less expensive than that now used.

Another object is to provide a new and improved apparatus and method for binding marginally perforated sheets into books and the like, by means of thin thermoplastic material, wherein the material is positively fed and trained about the edge of the sheets to define the loops.

Another object is to provide a new and improved method and apparatus for binding marginally perforated sheets into books and the like by means of thermoplastic ribbon, wherein the ribbon ends are sealed together to form binding loops.

Another object is to provide a new and improved method and apparatus for feeding ribbons of thin thermoplastic material through the perforations in the edges of marginally perforated sheets for the purpose of binding such sheets into books.

Another object is to provide a new and improved method and apparatus for binding marginally perforated sheets into books, by means of loops of thin plastic material wherein the plastic of the loop is severed from the source of supply by means of a heated element.

Another object is to provide a new and improved method and apparatus for binding marginally perforated sheets into books and the like by means of loops of thin plastic material, wherein the loops are severed from the source of supply by a movable slicing knife means.

Another object is to provide a new and improved method and apparatus for binding marginally perforated sheets into books and the like, by means of loops of thin plastic material, wherein predetermined lengths of the plastic are drawn from sources of supply, threaded through the perforations and about the marginal edge, and fused into the loops automatically.

Another object is to provide a new and improved method and apparatus for binding marginally perforated sheets into books, by means of loops of thin plastic material, wherein predetermined lengths which may be adjusted, are provided from coils for the formation of the loops.

Other objects and advantages will become apparent from the following description, taken in conjunction with the accompanying drawings, wherein FIG. 1 is a front elevational view of the booklet binding machine of the present invention;

FIG. 2 is a side elevational view, looking at the machine from the right side of FIG. 1;

FIG. 3 is an enlarged fragmentary elevational view taken from the left side of FIG. 4, and showing a detail of a portion of the ribbon feed drive;

FIG. 4 is an enlarged fragmentary front elevational view, partially broken into section, and illustrates constructional details;

FIG. 5 is a vertical sectional view, taken along the line 5—5 of FIG. 4, looking in the direction of the arrows;

FIG. 6 is a horizontal sectional view, with some parts further broken away, and taken along the line 6—6 of FIG. 4, looking in the direction of the arrows;

FIG. 7 is an enlarged vertical detail sectional view, taken along the line 7—7 of FIG. 4, looking in the direction of the arrows, and showing details of the ribbon feed, the heat sealer, the ribbon severing means, and operating means therefor, and showing these elements in the position they occupy at the conclusion of the loop forming operation;

FIG. 8 is a detail view showing the mount for the circuit conditioning switch, the actuating means therefor, and the sheet positioning lever, and is taken along the line 8—8 of FIG. 4, looking in the direction of the arrows;

FIG. 9 is a fragmentary perspective view of the edge of a booklet bound with loops of flexible thermoplastic ribbon;

FIG. 10 is a detail view of a modified flipper plate for looping the flexible ribbon about the marginal edge of the stacked sheets;

FIG. 15 is a diagram of a simplified control circuit for the apparatus.

Figure 11:
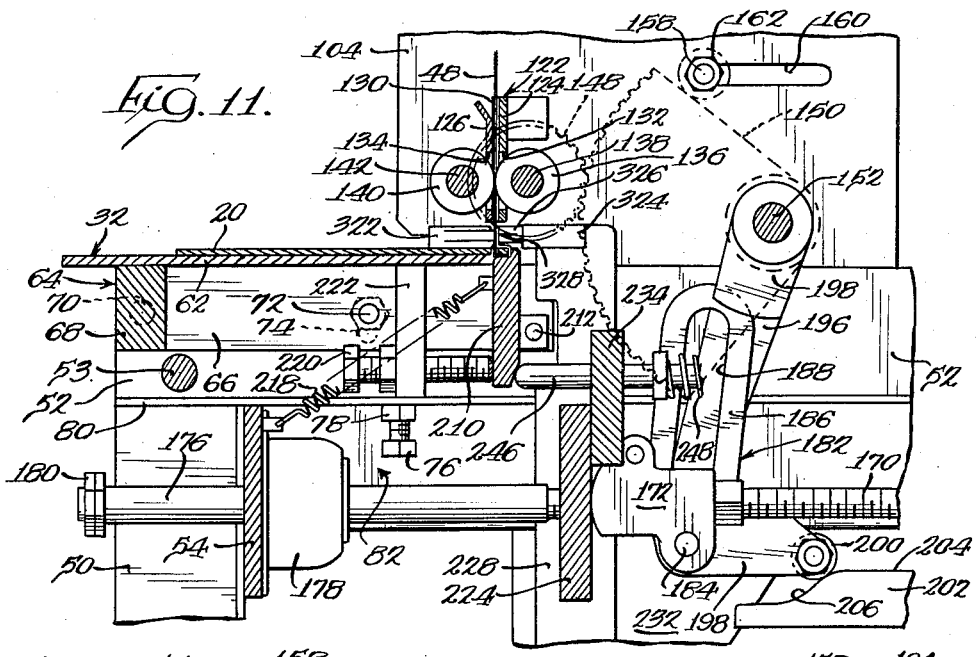
FIG. 11 is a view similar to FIG. 7, showing a modified heat sealing and ribbon severing means.

Referring first to FIG. 9, which is a fragmentary view of a booklet of a few sheets 20 bound in accordance with the present invention, it will be noted that the sheets 20 are formed with rectangular perforations 22 adjacent their marginal edges 24. Loops 26 of flexible thermoplastic material, such as polyethylene, polyvinyl acetate, polyvinyl chloride, or the like, extend through the perforations 22 and about the edges 24 of the sheets, and have tabs 28 formed by fusing or heat sealing together portions of the thermoplastic ribbon. It will be appreciated that while this figure shows the loops 26 as being substantially round, because they are made of thin flexible plastic material they will be and can be flattened. Furthermore, the tabs 28, while shown outside the pages or sheets 20, can be folded inside a rear cover, for example, so as to be hidden from view. This is done merely by properly stacking the sheets with the covers together at one side of the stack during the loop forming operation, and then folding the rear cover over the last page, thus bringing the tabs 28 inside the rear cover and presenting only curved portions of the loops 26 outside the booklet itself, giving the booklet a neat and finished appearance.

Another advantage in using material of this kind is that color variations may be obtained with loops being all of one color, or if desired, of various colors.

The apparatus for binding the sheets into the booklets fragmentarily disclosed in FIG. 9, is shown generally in FIGS. 1 and 2, to comprise a frame 30 on which is mounted a generally horizontally disposed table 32 to support the stack of sheets 20 during the binding operation, a ribbon magazine 34 surmounting the table, and mounted on the frame 30, a ribbon feed and guide 36, sealing means 38, and ribbon severing means 40.

The movable elements of the ribbon feed and guide 36, the sealing mechanism 38, and the severing means 40, are actuated from a power system indicated at 42 under the control of a control circuit 44 illustrated diagrammatically in FIG. 15.

The magazine 34 is arranged, as will be presently described, to support a plurality of coils 46 of thermoplastic material ribbon for feeding by the feeding and guide mechanism 36. The arrangement is such that there is a separate coil or spool of ribbon 46 for each of the perforations 22 in the book being bound. The machine is operated so that once the stack of sheets 20 is properly positioned on the table 32, a predetermined length of ribbon 48 from the coils 46 will be fed through each of the perforations 22 in the marginal edges of the sheets 20. The predetermined length of ribbon is looped about the marginal edge 24, and the sealing mechanism 38 fuses the free end of each ribbon 48 against a standing portion thereof to form the tabs 28. At the same time, the severing mechanism 40 severs the tabs 28 and loops 26 from the standing ribbon portions and the coils 46, and the machine is readied for a subsequent binding operation. Once the cycle has begun, this operation, as briefly described hereinabove, is completed automatically.

The frame 30 of the machine comprises four legs 50 interconnected by top side frame members 82 running from the front to the rear of the machine with the legs 50 and frame members being interconnected at the upper end of the frame by transverse frame members 54 and 56. The frame channel 56 is adapted to support, as will be more fully described hereinafter, a portion of the power system of the machine. The frame also includes, below the top rail structure, a platform 58 on which the controls and timer indicated generally at 60 are mounted. Surmounting the side frame members 82 is a subframe comprising a pair of side rails 52 lying on top flange 80 of the frame members 82 and connected by the rods 53.

The table 32 comprises a plate 62 mounted on a frame 64 which includes a pair of side rails 66 and a transverse rail 68 interconnecting them at the front or operator side of the machine. The table is vertically adjustable and at its forward edge the table frame 64 is pivoted on pins 70 to the side rails 52. Adjacent the inner ends of the rails 66 they are fitted with bolts 72 which project through slots 74 in the side rails 52. The inner end of the table frame 64 is supported on positioning bolts 76 which are threaded through nuts 78 carried in the horizontal flanges 80 of the T-shaped side frame members 82. The upper ends of the bolts 76 engage the underside of the side rails 66 of the table frame, and thus support it and the table in the adjusted position. The table is adjustable to accommodate booklets of varying thickness below the sealing and severing means 38, 40, the positions of which are fixed with respect to the frame of the machine, and consequently the flexibility is obtained by making the table movable. The ribbon feed is also adjustable and is adjusted when the position of the table is changed.

The sheets 20 are positioned on the table 32 so that the perforations 22 project over the inner edge 84 of the table, thereby providing free passage for the insertion of the ribbons 48. However, the sheets must be accurately positioned with respect to the ribbon feed and guiding mechanism 36, and this is in part accomplished by a plurality of movable stops 86 shown in detail in FIG. 8. Each stop comprises an L-shaped bar 88 slidably mounted in a bracket 90 having a central slide way 92 therein and affixed to the underside of the table plate 62. There are three of these stop assemblies, one at the right edge of the table, one slightly to the right of center, and one adjacent the left edge of the table, and since they are substantially identical only one of them will be described.

The bar 88 has, at its forward or inner end, an upstanding finger 94 which is engageable by the inner edges 24 of the sheets and forms a stop for them in their innermost position. The fingers 94 project above the surface of the table an appreciable amount to align the marginal edges 24 of the sheets so that the perforations 22 are similarly aligned for the free insertion of the ribbons 48. The bar 88 is normally held in the full line position by a spring 95 connected between the bar and the bracket 90 and is movable to the dotted line position by the stack of sheets 20 as it is inserted into the machine.

At its opposite end the bar 88 has a downwardly projecting switch operating and movement limiting arm 96 adapted to close a position indicating switch 98 which is affixed, with its operating button 100 aligned with the arm 96, to the underside of the bracket 90. There are three of these switches indicated by the reference characters 98L, 98C, and 98R, to locate them on the underside of the table. These have been indicated by the same reference characters in the wiring diagram (FIG. 15). These switches must either be closed or bypassed in order to condition the electrical circuit 44 for operation of the machine, and they will not close unless the sheets 20 have been properly stacked and inserted into the machine so that the perforations 22 project over the inner edge 84 of the table to clear the perforations for the insertion of the ribbons 48.

The guide at the right-hand side of the table for aligning the right edges of the sheets comprises a bar or block 102 adjustably mounted on the upper surface of the table. A similar adjustable guide 121 is mounted on the left side of the table.

The ribbon magazine 34 is carried above the table and the ribbon feeding and guiding mechanism 36, on a pair of side plates 104 which are mounted on the side rails 52 by bolts 106. A pair of long bolts 108 extend between the plates 104 and mount a plurality of ribbon spool supporting plates 110. The plates 110 are spaced apart a distance only slightly greater than the thickness of a coil of ribbon or the width of the ribbon, by spacers 112 carried on the bolts 108. The plurality of spool supporting plates 110 are accurately mounted in the magazine and between the plates 104 and on the supporting bolts by end spacers 114. Each of the plates 110 is formed at its upper edge with a recess having an arcuate base surface 116 which forms the bearing support for the coils of ribbon 46. The coils of ribbon 46 are wound on cores 118 which are thicker than the width of the ribbon and project from the coil of ribbon wound thereon on both sides to permit rotatably supporting the coils 46 between adjacent plates 110. The bearing surfaces for the cores 118 of the ribbon coils 46 may be formed on a sheet metal stamping which is slotted to accommodate the ribbons and bent to the profile shown in FIG. 5.

It will be observed from FIG. 5 that the ribbon 48 is withdrawn from the lower side of the coil 46 upwardly toward the front of the machine and over a ribbon feed direction reversing bar 120 carried between the plates 104 in front of and slightly above the centers of the ribbon coils. This direction reversing bar 120 also assists in regulating the tension on the ribbons and effectively prevents coasting and overrunning of the coils 46 during the feeding operation.

The ribbon feed and guide mechanism 36 includes a guiding structure 122 which is most clearly illustrated in FIGS. 4, 5, 6, and 7, as comprising a pair of plates 124 and 126 which extend the entire distance between the guide plates 104 and are mounted thereon by brackets 128. The plate 124 is appreciably thicker than the plate 126 and is formed with a plurality of vertically extending slots 130 which are closed by the plate 126. It will be noted that these slots are very shallow, are as wide as the ribbon, and with the plate 126 define the guide passages through which the ribbons are fed to be inserted through the rectangular perforations 22 in the stacked sheets 20. The upper edge of the plate 126 is bent forwardly away from the plate 124 to facilitate the initial insertion of the ribbon ends into the slots or grooves 130.

Where the plates 124 and 126 are contiguous, they are formed with rectangular windows 132 and 134, the windows 132 being formed in those portions of the plate 124 having the slots 130. It will be noted from an examination of FIGS. 4 and 6 that there is a slot 130 for each ribbon 48, and consequently there is a pair of windows 132 and 134 for each ribbon 48.

The ribbon feed is shown most clearly in FIGS. 3, 4, 5, 6, and 7, and comprises a plurality of metallic serrated rollers 136 mounted on a shaft 138, and a plurality of soft rolls 140 mounted on a shaft 142. The soft rolls 140 are formed by fitting the shaft 142 with a sleeve of resilient rubber or rubber-like material, and turning the sleeve between the roll portions 140, thus giving the rolls support against sideward displacement. The parallel shafts 138 and 142 are mounted to rotate in opposite directions and are geared together at the right-hand side of the machine by intermeshing gears 144 and 146 mounted respectively on the shafts 142 and 138 (FIGS. 2, 4 and 6).

The shafts 138 and 142 are so positioned that the rollers or feed wheels 136 project through the windows 132 and the rolls 140 project through the windows 134 to contact the rollers 136. The nips between the rollers 136 and rolls 140 lie in the passages defined by the grooves 130 and the ribbon 48 may be drawn between the rollers 136 and 140, through the guide passages, and fed to the sheet perforations 22.

The shafts 138 and 142 are journaled in suitable bearings carried by the side plates 104 and at one end the shaft 138 projects outwardly of the plate 104 and carries a gear 148 which is in mesh with a gear segment 150 fixed to a rock shaft 152. The gear 148 runs freely on the shaft 138 and is connected thereto in driving relation by an overrunning or one-way clutch 154 which is associated with a brake assembly 156 to prevent overrunning of the shaft in the driven direction. The details of this assembly will be described hereinafter in connection with the second embodiment of the machine.

The rock shaft 152 is rotated in the ribbon advancing direction from the power system 42, as will be explained hereinafter, and it drives the gear segment in the counterclockwise direction (FIG. 3), rotating the gear 148 which at this time is connected through the clutch 154 to the shaft 138, thereby rotating the shaft and the rollers 136 thereon in the ribbon feeding direction. Since the shaft 138 and the shaft 142 are interconnected through the gears 144 and 146, the presser rollers 140 will similarly be rotated in the ribbon feeding direction, the rollers 136 being rotated in the counterclockwise direction and the rollers 140 in the clockwise direction (FIG. 7) to feed the ribbon downwardly through the guide slots 130 and thereafter through the rectangular perforations 22 in the sheets 20. The gear segment 150 is permitted a limited movement which is terminated by an adjustable stop 158 which is mounted in a slot 160 (FIGS. 3 and 7) in the adjacent side plate 104. The stop takes the form of a bolt which has a nut 162 on the end opposite its head to lock it in adjusted position.

In FIG. 3 the gear segment 150 is shown in the position it occupies at the start of a ribbon feeding operation. In FIG. 7 the gear segment is shown in dotted lines at the end of the ribbon feeding operation, and with an edge of the segment against the stop 158. Thus, the position of the stop with relation to the gear segment limits the rotational travel of the segment, and consequently the amount of ribbon drawn from the coils 46, thus providing a nicety of ribbon feed control.

To insure proper and positive feed and to make certain that all the rollers 136 and 140 remain in contact with the ribbon, the shafts 138 and 142 are tied together by a floating bearing 164 (FIG. 4) adjacent their centers. This floating bearing is desirable when the shafts 138 and 142 are relatively long and may be dispensed with in machines where the shafts are shorter.

The power system includes a pneumatic cylinder 166 mounted on the frame member 56 and having a piston rod 168 projecting therefrom. The air cylinder 166 is connected through a solenoid operated four-way valve 170 (FIG. 15) to a suitable source of air pressure (not shown) so that the piston rod 168 may be reciprocated. If desired the piston and rod may be returned by spring pressure to the retracted position. The piston rod 168 has a threaded extension 170 on which is adjustably mounted a push block 172 the position of which is secured by a lock nut 174. The rod extension 170 has an unthreaded portion 176 which projects under the table 32 through a guide 178 carried on the transverse frame member 54. A pair of retraction limiting nuts 180 are carried at the outer end of the rod portion 176 to limit the retracting movement thereof.

A bell crank lever 182 is pivotally carried by the push block 172 at one side thereof on a pivot pin 184 and has a generally vertically extending arm 186 formed with a slot 188 therein. A roller 190 is vertically movable in the slot and is carried on a pin 192 projecting laterally from the lower end of lever or arm 196 which is fixedly mounted on the rock shaft 152. A short stabilizing arm 198 is similarly fixed to the rock shaft parallel to the lever 196 and spaced therefrom a distance sufficient to accommodate the vertically extending arm 186 of the bell crank lever 182 therebetween.

Thus, when the piston rod 168 is projected from the air cylinder 166 or to the left as seen in FIGS. 5 and 7, the push block 172 carries the pin 184 leftward, thereby drawing the bell crank lever 182 with it. The roller 190 riding in the slot 188 in the bell crank lever rocks the arm 196 in the clockwise direction (FIGS. 5 and 7), thereby rotating the shaft 152 in a similar direction and moving the gear sector 150 in the ribbon feeding direction.

The bell crank lever 182 has a second arm 198 at the outer end of which is pivoted a roller 200 which rides on the upper surface of a cam 202 having a straight portion 204 and a curved or inclined portion 206. The cam is adjustably mounted on the frame member 56 on a bracket 208 and is longitudinally movable as seen in FIGS. 5 and 7 to adjust the position at which the roller will ride off the straight cam portion 204 and down onto the curved or inclined portion 206. The cam 202 has its position adjusted so that when the gear sector 150 comes into contact with the stop 158 the roller 200 moves down the inclined cam surface 206, thereby permitting the bell crank lever 182 to pivot about the pivot pin 184 and terminate the rocking or rotational movement imparted to the lever 196, the rock shaft 152, and the gear sector 150. The position of the cam 202 and the position of the stop 158 must be coordinated, the latter being provided to prevent overtravel or coasting of the gear sector 150 toward the end of the ribbon feeding operation which would, in effect, feed a greater length of ribbon than predetermined conditions require.

When the predetermined lengths of ribbon have been fed, it is necessary that the ends of the ribbon be turned about the edges 24 of the sheet 20 and moved to a position opposite the standing portion of the ribbon so that the two adjacent portions can thereafter be fused together to form the loops 26 and tabs 28. This movement is done by a flipper bar 210 pivoted at 212 to the side rails 66 of the table frame 64. The flipper bar 210 extends the entire distance under the inner edge 84 of the table 32 and therefore is long enough to engage and turn all of the ends of the ribbons 48 projecting through the rectangular perforations 22 in the sheets.

The upper edge 214 of the flipper bar 210 is formed with a notch 216, and the bar itself as it moves from rest position to ribbon trained position, engages the underside of the sheet stack adjacent its edge and moves it upwardly very slightly to insure the proper movement of the ribbons 48 around the marginal edges 24 of the sheets. When the bar 210 reaches the end of its movement the marginal edges of the sheets sit in the bar notch 214 (FIG. 7). The bar is returned to its rest position by a spring 218 which extends between its rear face and the transverse frame member 54. The bar in its ribbon trained position is moved against a stop 220 which comprises a long bolt carried on a bracket 222 depending from the underside of the table 32.

The flipper bar or plate 210 is moved between the positions shown in FIGS. 5 and 7 by mechanism operated from the air cylinder 166 and the push block 172.

Adjacent the end of its advancing movement, the push block 172 engages a bar 224 having an opening 226 through which the push or cylinder rod extension 176 projects. The bar 224 is carried by and between a pair of arms 228 mounted on a shaft 230 at the lower end of depending portions 232 of the side plates 104. The bar 224 carries a plate 234 which projects slightly thereabove, as seen in FIG. 7, and which mounts a yoke 236 (FIG. 6). The yoke comprises a pair of bolts 238 fixed to the plate 234 and interconnected at their outer ends by a second plate 240, the position of which on the bolts 238 may be adjusted by nuts 242. A plunger 246 is slidably supported between the plates 234 and 240 in suitable apertures in each to project leftwardly of the plate 234 (FIGS. 6 and 7) and the transverse bar 224 toward the flipper plate 210. The plunger 246 is biased leftwardly by a coil spring 248 confined between the plate 240 and a washer or similar stop 250 carried by the plunger 246. As the push block 172 moves the transverse bar 224 forwardly or about the pivot 230, the yoke 236 and the plunger 246 are similarly moved forwardly, and since the plunger projects beyond the edge of the bar 224, it engages the flipper plate 210 adjacent its lower edge and below the pivots 212. The flipper bar 210 is pivoted from the position shown in FIG. 5 to that shown in FIG. 7, and against the stop 220. This movement flips or trains the ends of the ribbons 48 about the marginal edges 24 of the plates and presents them in a position adjacent the standing ribbon portion. When the flipper bar 210 comes against the stop 220 the plunger 246 stops and the spring 248 is compressed to accommodate further movement of the arms 228 and plate 224.

At their upper ends the arms 228 carry a heater 252 comprising a metallic plate 254 and a resistance heater 256, the coil of which is indicated in the circuit diagram (FIG. 15). The movable heater plate 254 cooperates with a stationary plate 258 mounted on the side plates 104 and located just over the table 32 and beneath the feed rollers and ribbon guide 122. The forward edge of the plate 258 is so positioned that the ribbons 48 will pass freely thereby as they are fed from the coils 46 and through the guide 122 and perforations 22. The heater control circuit is timed so that when the push block 172 has advanced the heater 252 so that the leading trained about end and standing portions of the ribbon 48 are clamped between the plate 258 and the bar 254, the latter will be heated. The bar 254 is held in clamping and ribbon fusing position momentarily to permit complete fusing of the ribbon portions together and the formation of the tabs 28. It is preferred that the bar 258 be of a polished steel, such as stainless steel, and that the heater bar 254 be covered with a protective material such as Teflon. The polished surface of the bar 258 will prevent the ribbons from sticking thereto, and the withdrawal of the heater bar 254 from the fusing position will free the fused tabs 28 therefrom. It is, of course, desirable that the heater be protected with a thermostatic switch 260 in circuit therewith to prevent overheating of the heater and also to shut off the heating after a predetermined short interval of time.

It will be observed that as the push block 172 is withdrawn at the end of the heating cycle, the spring 248 in the yoke 236 will push the plunger 246 forwardly, thereby pushing the assembly of the bar 224 and arms 228 in the clockwise direction (FIGS. 5 and 7).

At the same time the sealer 38 is actuated and operated by the power system, the severing means or cut-off 40 is operated. This comprises a stationary knife 262 carried by the ribbon guide assembly 122 with a cutting edge at the lower ends of the slots 130 through which the ribbons are fed. The severing means 40 also includes movable knife means 264 which are most clearly shown in FIGS. 6 and 7. The movable knife means 264 includes a long bar 266 slidable in slotted support blocks 268 at either side of the table and carried on the side rails 52. Fitted to the forward edge of the bar 264 are a number of knife elements 270 each comprising a series of diagonal knife edges 272 and forwardly extending fingers 274. The fingers underlie the stationary knife blade 262 in contact therewith and act as guides for the knife elements 270. The individual slicing edges 272 are so arranged that they pass below the guide slots 130 as the movable knife assembly is moved to the right, as seen in FIGS. 5, 6, and 7. In view of the composition of the plastic ribbons 48, it is desirable that they be sliced as they would be between the blades of a pair of shears. It is for this reason that the knife edges 272 are arranged at an angle to the longitudinally extending severing edge of the stationary knife member 262. Each severing element 270 is detachably mounted on the bar 266 by screws or other removable fasteners 276 so as to be readily replaceable in the event any of the elements are damaged or any of the knife edges 272 become knicked and fail to slice the ribbons cleanly. It should also be noted that these elements 270 are very thin and in that respect are like thin razor blades.

The bar 266 is moved through its slicing stroke by a linkage actuated from the arms 228 and which comprises a pair of levers 278 pivoted on pins 280 on the depending or stem portions of the side frame members 82. The arms project upwardly and downwardly from the pivot pins and at their lower ends are fitted with rollers 282 carried on pins 284. The rollers are contacted by the edges of the arms 228 as the arms are moved in the counterclockwise direction (FIGS. 5 and 7), thereby rocking the levers 278 in the clockwise direction about the pivots 280. At their upper ends the levers 278 are pivotally connected to links 286 which in turn are connected to depending fingers 288 fastened to the lower surface of the movable knife bar 266. Thus, as the levers 278 are pivoted in the clockwise direction by the arms 228, the movable knife element 264 is moved toward the stationary knife 262 and through a slicing stroke, and the ribbon loops 26 are severed from the standing portions of the ribbons 48. It should be noted that the upper portions of the levers 278 extend through suitable slots or openings in the horizontal flanges 80 of the side frame members 82, and that the depending fingers 288 project downwardly through appropriate slots in the table plate 62.

The movable knife assembly 266 is positively retracted from cutting position by L-shaped retractors 290 adjustably mounted by means of bolts 292 and a slot 294 in each retractor, to the arms 288. Each retractor 290 has an upwardly projecting finger 296 which engages the adjacent roller 282 and thus as the arms 228 are retracted, the movable knife assembly 266 is positively returned to the position shown in FIGS. 5 and 6.

Referring to FIG. 15, it will be noted that many of the elements which have been discussed herein, including the circuit conditioning switches 98, the heater 256, the thermosat 260, the solenoid operated valve 170, the air cylinder 166, are diagrammatically shown. Electric power for operating the circuit elements is supplied by lines L1 and L2 and through a manually closable operating switch 298, which is in series with the switches 98L, 98C, and 98R which are closed when the sheets 20 are properly positioned on the table 32 and the limit stops 86 have been pressed forwardly to the dotted line position shown in FIG. 8. The circuit through a time delay relay 300 is thus comleted through a normally closed switch 302, and the relay is operated closing a holding circuit switch 304, which is in parallel with the switch 302, and opening the latter. These switches and the relay coil 300 are in series with the heater 256 and heater thermostatic switch 260 and with a solenoid 306 for the four-way air valve 170, the coil of the solenoid being in parallel with the heater.

The manually closable start switch 298 is held in closed position by the relay 300. After an appropriate time has elapsed and the heater bar 254 has been held in contact with the plastic ribbons and against the bar 258 to form the fused tabs 28, the time delay relay 300 operates to open the switch 304 and the start switch 298 and condition the circuit by closing the switch 302. However, since the main switch 298 is open, the solenoid will be deenergized, permitting the valve 170 to return to its initial position, venting the head end of the cylinder and connecting the rod end of the cylinder to air under pressure, thereby retracting the piston rod 168. As previously indicated, however, this return can be effected by spring pressure, provided the head end of the cylinder is appropriately vented.

To take care of situations where books which are shorter than full table width are to be bound by the loops of plastic, the switches 98L and 98C may be appropriately bypassed by switches 308 and 310. When the switch 308 is closed switch 98L at the left side of the machine will be bypassed, and when the switch 98C is to be bypassed then the switch 310 is closed, which will also bypass the switch 98L. It is essential, however, that the switch 98R always remain in the circuit, and consequently there is no means for bypassing this switch.

The machine operates in the following manner:

Assume that a book of medium length or height is to be bound, which will not extend entirely across the table 32. The machine is fitted with the appropriate number of coils 46 of thermoplastic ribbon 48, and they are disposed in the appropriate positions in the ribbon magazine 34. The bypass switch 308 is closed because the position switch 98L will not be closed by the short book sheets.

The book is inserted into the machine by placing it on the table 32 and guiding it against the right-hand guide 102, pushing it forwardly to contact the center and right stop fingers 94. When the corresponding elements 86 have been moved forwardly to the limit of their movement the switches 98C and 98R close and the switch 298 may be manually closed to energize the time delay relay 300, opening the switch 302 and closing switch 304. The solenoid 306 is operated to connect the head end of the cylinder 166 through the valve 170 with air under pressure. The heater 256 is also energized and the fusing bar 254 will be heated by the heater element.

Air entering the cylinder 166 projects the piston rod 168 and the extensions thereof away from the cylinder and moves the push block 172 leftward, as seen in FIGS. 5, 6, and 7. This movement, through the bell crank lever 182 and the lever 196, rocks the shaft 152 and swings the gear segment 150 in the clockwise direction as seen in FIGS. 5 and 7, or in the counterclockwise direction as seen in FIG. 3. The gear segment 150 drives the gear 148 clutched to the shaft 138 which is geared to the shaft 142, and consequently the feed rollers 136 and 140 in ribbon feeding directions, drawing predetermined lengths of ribbon 48 through the guide slots 130 and feeding them through the rectangular perforations 22 in the stacked sheets 20. As the push block 172 approaches the full extent of its travel, it engages the bar 224 and the plunger 246 contacts the flipper bar 210. The flipper bar flips the ends of the ribbon which are projected below the stacked sheets 20, and trains them about the marginal sheet edges 24, bringing them to an upstanding position adjacent the standing portions of the ribbons. As this is accomplished the movable heater bar 254 contacts the stationary clamping element 258, clamping the ribbon portions therebetween, and the clamped ribbon portions are fused together, forming the tabs 28. At the same time the movable knife assembly 266 is moved rightwardly as seen in FIGS. 5, 6, and 7, and the ribbons adjacent the lower ends of the guide slots 130 are sliced off against the stationary knife 262 to free the loops 26 and the bound book from the standing portions of the ribbons 48.

After an appropriate and very short time interval has elapsed, the time delay relay 300 operates to open the circuit, thereby deenergizing the heater 256 if it has not previously been deenergized, deenergizing the solenoid 306, and permitting the cylinder 166 either under air pressure or under spring pressure, to retract the piston rod 168 and the push block 172. At the same time the spring 248 pushing against the yoke 236, projects the plunger to move the assembly of the yoke, the bar 224, and arms 228, toward their initial position and away from the ribbon sealing and severing position which is shown in FIG. 7; inasmuch as the weight center of this rockable assembly is toward the rear of the machine it returns naturally to the position of FIG. 5 without further force application. The bound book is withdrawn from the table, and an unbound stack of sheets is inserted for a subsequent operation.

A modified flipper bar 312 is shown in FIG. 10. It comprises a plate appreciably thinner than the plate 310, and it pivots at its lower edge on a pivot 314. It is provided with an actuating element 316 fitted with a roller 318 at its outer end for engagement with the plunger 246 which has a diagonal camming surface 320 formed thereon for engagement with the roller 318. It operates and functions in exactly the same fashion as does the flipper plate 210, except that it does not have the notch 216 formed therein which may support the edges of the sheets after the ribbon has been trained thereabout.

A modified machine is shown in FIGS. 11 through 14, wherein a wire rather than a movable knife means is used for the purpose of severing the tabs 28 and ribbon loops 26 from the sources of ribbon supply. In these figures, where possible, the same reference characters are used to indicate elements previously described.

In this form the heater is in the form of a stationary block 322 fixedly mounted above the table 32 and below the ribbon guide 122, has a heating element similar to the heating element 256, and is provided with a thermostat protection switch 260. The block 322 is enclosed in a Teflon casing to protect it and also to provide a surface to which the material of the thermo-plastic ribbon does not readily stick. At the upper ends of the arms 228 is a transverse bar 324. The bar 324 is provided with a projecting silicon rubber pad 326 across which is drawn a fine wire 328 which projects slightly therefrom and which may be engaged against the heater block 322. As the arms 228 are swung in the counterclockwise direction (FIG. 11) the projecting and standing portions of the ribbons 48 are clamped between the heated block 322 and the pad 326. The heater 322 fuses the contacted ribbon portions which are pressed against the wire 328 and the ribbon material gets hot enough to cut itself against the wire, thereby severing the loops 26 and bound book from the standing ribbon portions. In this embodiment care should be taken to project only the appropriate portion of the ribbon so that upstanding portion which is turned by the flipper plate 210 does not project high enough to extend above the position occupied by the cutoff wire 328.

In this form some slight difficulty was encountered with the ends of the ribbon tending to stick to the surface of the heater element 322, even though the latter was covered with Teflon. Consequently, means were provided to impart a slight reverse movement to the feed roller shafts 142 and 138 at the conclusion of a machine cycle.

Figure 14:
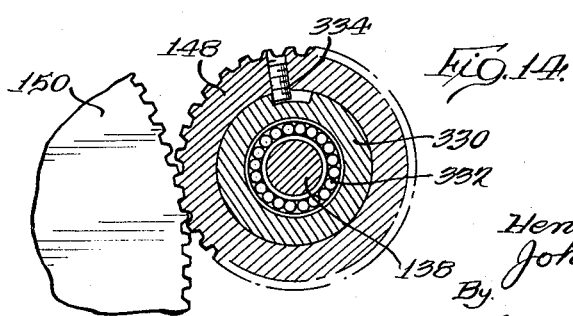
FIG. 14 is a view taken along the line 14—14 of FIG. 13, looking in the direction of the arrows.

As previously explained, the gear sector 150 is in engagement with a gear 148 mounted on the shaft 138 and adapted to be connected thereto by a clutch 154. The clutch includes a first member 330 freely journaled on the shaft 138 on bearings 332. The clutch element 330 has a slight lost motion connection at 334 with the gear 148, as seen in FIG. 14, the purpose of which will be explained hereinafter. The clutch element 330 has a bell shaped portion 336 which encloses a second clutch element 338 which is fixed to the shaft 138. A cap 340 encloses the bell and completes the housing for the clutch element 338. These are connected together in the well known overrunning clutch manner at 342. Thus, when the gear is driven in the clockwise direction (FIG. 14) the clutch element 330 is driven in a similar direction, and through the intermediary of the engaging member 342 the clutch element 338 is likewise driven, thereby driving the shaft 138.

During reverse rotation of the gear sector 148 and the counterclockwise rotation of the gear 148 (FIG. 14), the clutch elements 338 and 330 are disengaged at 342 and no motion is imparted to the shaft 138. In so far as thus described, this driving assembly may be used for the first described embodiment of the invention.

A conventional brake is also provided and comprises a pair of brake members or shoes 344 and 346 pivoted together at 348 and interconnected by a bolt 350 passing through ears 352 and 354 on the brake shoes 344 and 346, respectively. Braking pressure is provided by a spring 356 which urges the ears together and the brake shoes 344 and 346 against a drum 358 carried on the outer end of the shaft 138.

As the gear sector 150 is withdrawn by the positive withdrawal of the push block 172, and the rightward movement of the bell crank lever 182 and the lever 196 which turns the rock shaft 152 in the counterclockwise direction (FIG. 11), it reaches its initial position, and in doing so it contacts an adjustable stop 360 carried on a bar 362 which in turn projects towards the gear sector 150 from a lever or slide bar 364 which has one end pivoted to the brake shoe pivot 348 and its other end slotted at 366 and guided by a pin 368 which is fixed to the frame of the machine.

Figure 12:
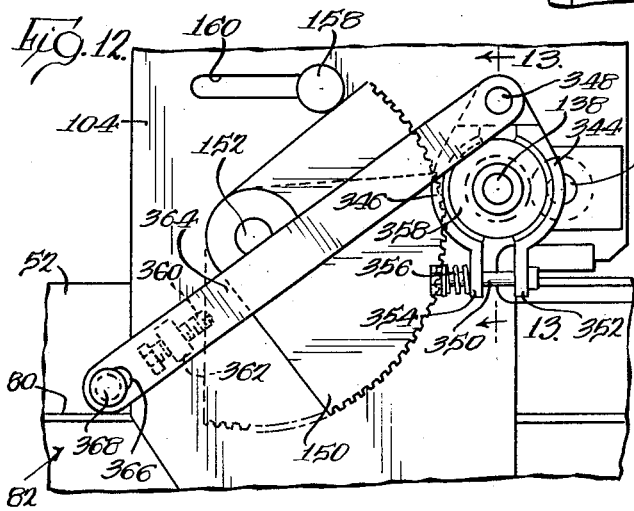
FIG. 12 is a fragmentary side elevational view, similar to FIG. 3, showing part of the ribbon drive, clutch, and brake, for the apparatus of FIG. 11.
Figure 13:
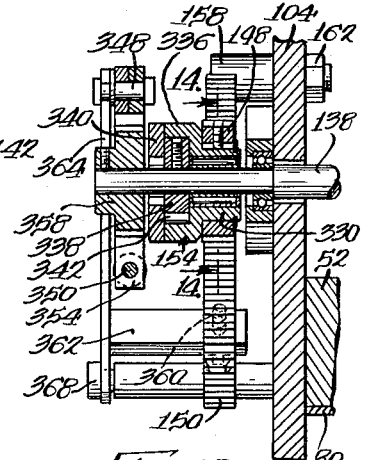
FIG. 13 is a sectional view through the clutch and brake, taken along the line 13—13 of FIG. 12, looking in the direction of the arrows.

When the gear sector almost reaches its fully retracted position, as indicated by the dotted lines in FIG. 12, its its edge contacts the adjustable stop 360 and gives it a sharp rap. This is transmitted through the transverse bar 362 to the slide bar or lever 364, pulling the pin 348 in the counterclockwise direction about the shaft 138 (FIG. 12). Since, however, the pin is connected to the brake shoes, and they in turn are connected through the brake drum 358 to the shaft 138, the latter will be given a movement in the counterclockwise direction (FIG. 12) or clockwise direction as seen in FIG. 11. This action is transmitted through the gears 146 and 148 at the opposite ends of the shaft and the ribbons are moved upwardly very slightly in the guide slots 130, thereby freeing any of their lower ends which may have stuck on the heater element 322. Reverse rotation is very slight and substantially instantaneous, so it does not in any way affect the operation of the machine. In order to prevent the clutch 154 and gear 148 from interfering with this reverse rotation of the shafts 138 and 142, the lost motion connection 334 is provided between the gear 148 and the clutch element 330.

With the indicated changes, the operation of this form of the machine is substantially the same as that of the previously described form, and it will not be repeated.

It will be observed from the foregoing description of this invention that the objectives which were claimed for the invention at the outset of this specification have been fully attained.

While preferred embodiments of the book binding apparatus and method have been described and illustrated, it will be apparent that numerous modifications and variations thereof may be made without departing from the underlying principles of the invention. It is therefore desired, by the following claims, to include within the scope of the invention all such variations and modifications by which substantially the results of the invention may be obtained through the use of substantially the same or equivalent means.

What is claimed as new and desired to be secured by United States Letters Patent is:

1. Apparatus for binding a plurality of sheets having marginal perforations into books and the like, comprising in combination, means for supporting the stacked sheets so that the marginal perforations are aligned, means for rotatably supporting a plurality of spools of ribbons of thermoplastic material, a pair of guide plates, said plates defining a guide slot for each of the ribbons, windows in each plate opening into said ribbon guide slots, a pair of ribbon engaging feed rollers for each of the ribbons, means mounting said rollers so that each pair projects through a pair of said windows to position the nip between said rollers in the respective ribbon guide slot, oscillatable means for intermittently driving said rollers to feed a measured length of the ribbons through said guide slots, adjustable means for limiting the length of the stroke of said oscillatable means to adjust the length of the fed ribbons, a pivotally mounted flipper plate for looping simultaneously the free ends of the ribbons about the marginal edges of the sheets adjacent the perforations and for holding said ribbon ends upstanding against the marginal edges of the sheets and adjacent but spaced slightly from the standing portions of the ribbons, means including a stationary element for moving the free ribbon ends and the standing ribbon portions against each other and a movable element for fusing the free ends of the ribbons to the standing ribbon portions to form flexible loops about the marginal edges of the sheets, means for severing the thusly formed loops from the standing ribbon portions, and means for moving said flipper plate and said movable element of said ribbon fusing means.

2. Apparatus for binding a plurality of sheets having marginal perforations into books and the like, comprising in combination, a generally horizontally disposed table on which a stack of sheets with aligned perforations is adapted to be supported with the perforated portion thereof disposed over an edge of said table, a ribbon magazine above said table and adapted rotatably to hold a plurality of spools of ribbon of thermoplastic material, means forming a ribbon guide having a plurality of vertically extending slots therein through which the ribbons are passed, a pair of feed rollers for each ribbon and between which the ribbon is fed, drive means connected to said rollers for intermittently driving the latter to feed predetermined lengths of ribbon through the guide slots and through the perforations in the stack of sheets, a movable flipper plate engageable with the leading free ends of the ribbons for looping those ends about the edge of the stack of sheets adjacent the perforations and for holding the free ribbon ends against the stack edge to upstand adjacent but spaced slightly from the standing portions of the ribbon, heat sealing means having at least one movable element for moving and clamping the free ends of the ribbons against the standing ribbon portions and for fusing the clamped ribbon portions together to form loops of ribbon through the perforations and about the marginal edges of the stacked sheets, means including at least one movable element for severing the ribbon loops from the standing ribbon portions, means connected to said flipper plate, to said movable sealing element, and to said movable severing element for moving said plate and said elements, and power means connected to said roller drive means and to said means for moving said flipper plate, said movable sealing element and said movable severing element for operating said drive means, said plate, and said elements.

3. Apparatus for binding a plurality of sheets having marginal perforations into books and the like, comprising in combination, a generally horizontally disposed table on which a stack of sheets with aligned perforations is adapted to be supported, guide means for the stack of sheets carried by said table and adapted to position said sheets on said table with the perforated portion thereof disposed over an edge of said table, a ribbon magazine above said table and adapted rotatably to hold a plurality of spools of ribbon of thermoplastic material, means forming a ribbon guide having a plurality of vertically extending slots therein through which the ribbons are passed, a pair of feed rollers for each ribbon and between which the ribbon is fed, a pair of openings in the opposite faces of each of said guide slots, means mounting said rollers to project into said guide slots through said openings to position the nip between the rollers in said slots, drive means connected to said rollers for intermittently driving the latter to feed predetermined lengths of ribbon through the guide slots and through the perforations in the stack of sheets, a movable flipper plate engageable with the leading free ends of the ribbons for looping those ends about the edge of the stack of sheets adjacent the perforations and for holding the free ribbon ends against the stack edge to upstand adjacent but spaced slightly from the standing portions of the ribbons, heat sealing means for moving the free ribbon ends against the standing ribbon portions and for fusing the adjacent ribbon ends and portions together to form flexible loops of ribbon through the perforations and about the marginal edges of the stacked sheets, means for severing the ribbon loops from the standing ribbon portions, and means for operating said flipper plate, said heat sealing means and said ribbon severing means.

4. Apparatus for binding a plurality of sheets having marginal perforations into books and the like, comprising in combination, a frame, a generally horizontally disposed table on which a stack of sheets with aligned perforations is adapted to be supported, adjustable means mounting said table on said frame for adjustment in a vertical direction, guide means for the stack of sheets carried by said table and adapted to position said sheets on said table with the perforated portion thereof disposed over an edge of said table, a ribbon magazine carried by said frame above said table and adapted rotatably to hold a plurality of spools of ribbon of thermoplastic material, means forming a ribbon guide having a plurality of vertically extending slots therein through which the ribbons are passed, a pair of feed rollers for each ribbon and between which the ribbon is fed, a pair of openings in the opposite faces of each of said guide slots, means mounting said rollers to project into said guide slots through said openings to position the nip between the rollers in said slots, drive means connected to said rollers for intermittently driving the latter to feed predetermined lengths of ribbon through the guide slots and through the perforations in the stack of sheets, movable means engageable with the leading free ends of the ribbons for looping those ends about the edge of the stack of sheets adjacent the perforations and for holding free ribbon ends against the stack edge and adjacent but spaced slightly from the standing portions of the ribbon, heat sealing means having at least one movable element for moving and clamping the free ends of the ribbon against the standing ribbon portions and for fusing the clamped ribbon portions together to form loops of ribbon through the perforations and about the marginal edges of the stacked sheets, means including at least one movable element for severing the ribbon loops from the standing ribbon portions, means connected to said movable sealing element and to said movable severing element for moving said elements, and power means connected to said roller drive means and to said means for moving said movable sealing element and said movable severing element for operating said drive means and said element.

5. In a machine for binding a plurality of sheets having marginal perforations into books and the like with loops of flexible thermoplastic ribbon having means for supporting a stack of sheets with their perforations aligned, ribbon feeding and guiding means including a pair of contiguous plates defining therebetween a plurality of guide slots with their outlets adjacent the sheet perforations through which the ribbons are fed from sources of ribbon supply, pairs of windows in said plates opening into said guide slots, pairs of rollers projecting through said pairs of windows to position their nips in said slots for feeding measured lengths of ribbons through said guide slots and the aligned sheet perforations, means for intermittently driving said rollers in the ribbon feeding direction to advance measured lengths of ribbon through said guide slots and the aligned sheet perforations, means for flipping the free ends of the fed ribbons about the edge of the stacked sheets nearest the perforations and for holding the free ends adjacent but spaced from the standing ribbon portions, and movable means for bringing the standing portions and free ends of the ribbons together, sealing them together to form loops, and severing the sealed loops from the standing ribbon portions.

6. In a machine for binding a plurality of sheets having marginal perforations into books and the like with loops of flexible ribbon having means for supporting a stack of sheets with their perforations aligned, ribbon feeding and guiding means including a pair of contiguous plates defining therebetween a plurality of guide slots with their outlets adjacent the sheet perforations through which the ribbons are fed from sources of ribbon supply, pairs of windows in said plates opening into said guide slots, intermittently driven pairs of rollers projecting through said pairs of windows to position their nips in said slots for feeding measured lengths of ribbons through said guide slots and the aligned sheet perforations, means for driving said rollers including an oscillatable gear segment connected to drive one roller with the two rollers being geared together, a movable flipper plate for training the free ends of the ribbons about and to hold them against the marginal edges of the sheets adjacent the perforations so that the free ribbon ends lie adjacent the standing ribbon portions, and a piston-cylinder means connected to oscillate said gear segment and to move said flipper plate.

References Cited in the file of this patent
UNITED STATES PATENTS

| | | |
|---|---|---|
| 2,106,419 | Anderson | Jan. 25, 1938 |
| 2,200,877 | Farkas | May 14, 1940 |
| 2,358,062 | Farkas | Sept. 12, 1944 |
| 2,571,525 | Blitstein | Oct. 16, 1951 |
| 2,809,852 | Miller | Oct. 15, 1957 |
| 2,930,054 | Bardy | Mar. 29, 1960 |

FOREIGN PATENTS

| | | |
|---|---|---|
| 157,636 | Australia | Mar. 29, 1952 |